(No Model.)
F. FEDERSCHMIDT.
BORING TOOL.
No. 496,253. Patented Apr. 25, 1893.
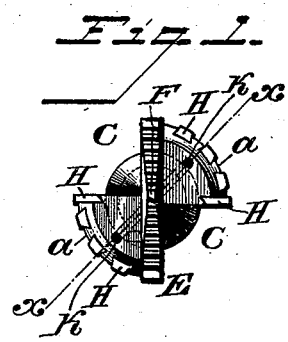
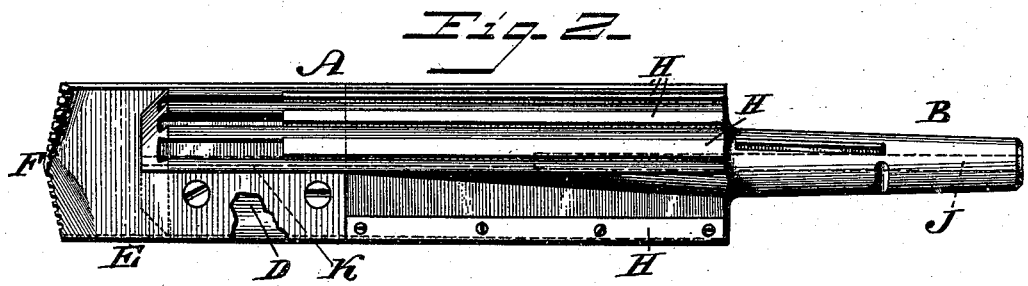
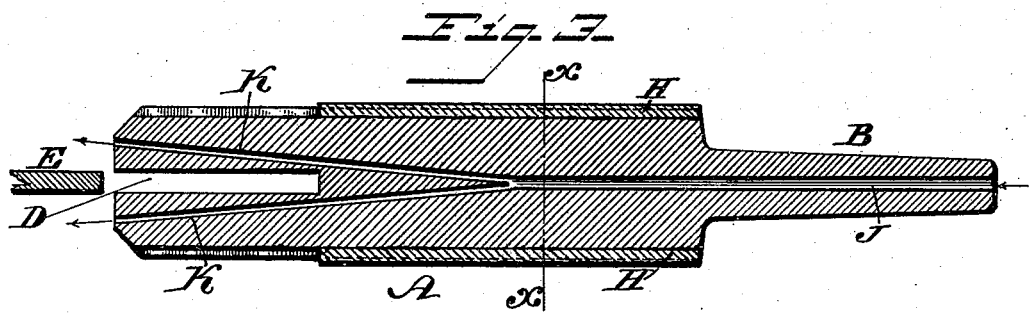
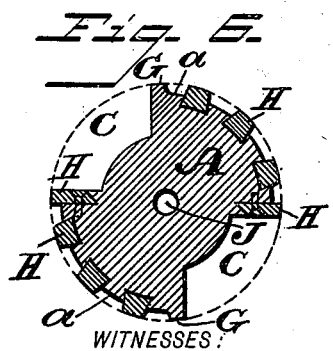
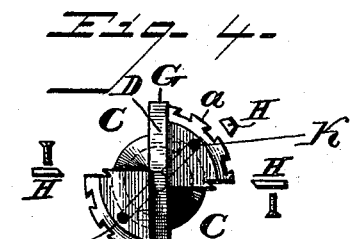
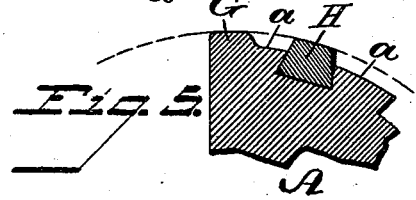
WITNESSES:
L. Douville,
P. H. Cragle
INVENTOR
Franz Federschmidt
BY
John A. Wiedersheim
ATTORNEY.

UNITED STATES PATENT OFFICE.

FRANZ FEDERSCHMIDT, OF PHILADELPHIA, PENNSYLVANIA.

BORING-TOOL.

SPECIFICATION forming part of Letters Patent No. 496,253, dated April 25, 1893.

Application filed April 27, 1892. Serial No. 430,935. (No model.)

*To all whom it may concern:*

Be it known that I, FRANZ FEDERSCHMIDT, a citizen of the United States, residing in the city and county of Philadelphia, State of Pennsylvania, have invented a new and useful Improvement in Boring-Tools, which improvement is fully set forth in the following specification and accompanying drawings.

My invention consists of a tool for boring metal having novel features and possessing advantages as will be hereinafter fully described.

Figure 1 represents a front end view of a boring tool embodying my invention. Fig. 2 represents a side elevation thereof. Fig. 3 represents a longitudinal section thereof, on line $x$, $x$, Fig. 1. Fig. 4 represents a front end view of the tool, certain parts thereof having been removed therefrom. Fig. 5 represents a transverse section of a portion on an enlarged scale. Fig. 6 represents a section on line $x$, $x$, Fig. 3.

Similar letters of reference indicate corresponding parts in the several figures.

Referring to the drawings: A designates the head of the tool and B the shank thereof. In the head are the opposite side channels C, and the central recess D, all of which extend in the longitudinal direction of the head.

E designates the boring bit which is fitted in the recess D, and screwed or otherwise firmly connected with the walls of the channels C, said bit having a boring or cutting edge with a projecting face or point F, it being noticed that when the tool is presented to the work and properly rotated, the edge F bores or cuts the same in an effective manner and the borings enter the channels C, by which they may be directed rearward. It will also be seen that one-half of the sides of the bit is braced against one of the adjacent walls of the channels C, while the other half thereof is braced against the opposite wall thereof, see Figs. 1 and 4, thus firmly sustaining the bit and providing a strong structure.

In order to guide the tool in the opening it occupies during the boring operation, a portion of the periphery of the head is reduced as at $a$, leaving the parts G of said periphery the full diameter of the head equal to the width of the point F, said parts coming in contact with the wall of the opening that is bored, thus steadying and guiding the tool and causing true and perfect work. To increase the steadying and guiding action of the parts G, I apply to the peripheries of the reduced portions $a$, $a$, pieces H which extend in the longitudinal direction of the tool and project to an extent coincident with the parts G, so that the tool is provided with guides all around the head without occasioning the extent of friction that would be created were said head of uniform diameter.

The recesses to receive the pieces H are dove-tailed, and said pieces are similarly shaped, whereby the latter are firmly held in position, and they may be readily removed and reapplied by motions in the longitudinal direction of the tool.

The pieces H at the sides of the channels C are secured by screws to said walls as a convenient form of attaching the same to the head.

J designates a duct which extends through the shank B and partly through the head A, and diverges through the remainder of the head to the front end thereof as at K, whereby water, oil, or other fluid may be directed through the tool to the boring point.

Having thus described my invention, what I claim as new, and desire to secure by Letters Patent, is—

1. A boring tool having a head with longitudinal channels on opposite sides, and a central recess at one end, and a bit secured in said recess and bearing on its opposite sides against the sides of said channel, the periphery of said head having reduced portions forming projecting guide portions adjacent to said channels, said parts being combined substantially as described.

2. A boring tool consisting of a head with longitudinal channels on opposite sides and a central recess, the periphery of the head being reduced forming longitudinally extending projecting guide portions adjacent to the said channels and the reduced portions being provided with the longitudinal pieces H, said parts being combined substantially as described.

FRANZ FEDERSCHMIDT.

Witnesses:
JOHN A. WIEDERSHEIM,
A. P. JENNINGS.